(No Model.)
J. HEWITT.
TRIPOD.
No. 478,233. Patented July 5, 1892.
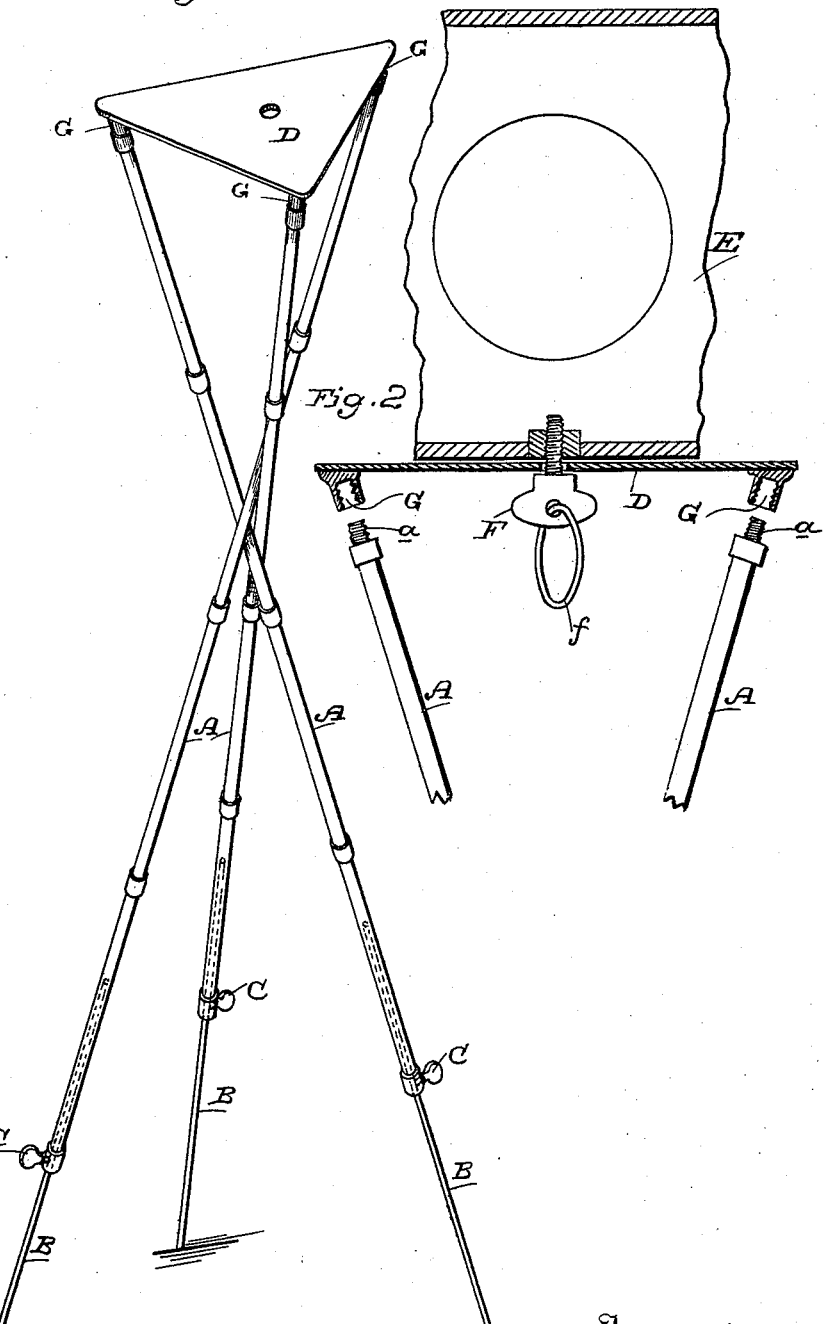

UNITED STATES PATENT OFFICE.

JAMES HEWITT, OF BERKELEY, CALIFORNIA.

TRIPOD.

SPECIFICATION forming part of Letters Patent No. 478,233, dated July 5, 1892.

Application filed August 1, 1891. Serial No. 401,418. (No model.)

*To all whom it may concern:*

Be it known that I, JAMES HEWITT, a citizen of the United States, residing at Berkeley, Alameda county, State of California, have invented an Improvement in Tripods; and I hereby declare the following to be a full, clear, and exact description of the same.

My invention relates to that class of tripods especially designed for photographic cameras; and it consists of the constructions and combinations of devices, which I shall hereinafter fully describe and claim.

The object of my invention is to provide a simple, light, and compact tripod, more particularly intended for small cameras, with which it is the better associated in that by its lightness and compactness it will not add to the burden of those photographers who carry the smaller classes of cameras only because they are convenient.

Referring to the accompanying drawings for a more complete explanation of my invention, Figure 1 is a perspective view of my tripod. Fig. 2 is a view of the tripod head, showing the fastenings on its under surface, to which the upper ends of the legs, which are here shown about to be attached thereto, are fastened.

The legs A of the tripod, though they may be made of any suitable material, are preferably made of tubular metal, as light as desirable, and having a convenient length, which is sufficient, taken in connection with the small diameter of the metal, to render the legs somewhat springy or flexible. They may each be made of a single tubular piece or of shorter sections coupled or jointed in proper manner, which will lend stiffness and add to their general appearance. These legs are rendered extensible by having foot-pieces, consisting of metal rods B, fitted telescopically into their lower ends and adapted to be housed completely therein or projected to any desired distance, being held in the position to which they are adjusted by means of set-screws C. The upper ends of the legs are provided or formed with externally-threaded points a.

D is the tripod head or plate, upon which the camera E is secured in suitable manner, as by the usual central screw F, to which a ring f may be attached for the purpose of permitting the operator to steady the tripod and camera in a wind by placing his fingers in said ring. Under the tripod head are the internally-threaded sockets G, which are peculiarly located in that they incline inwardly in downwardly-converging lines, as shown. The legs A are secured to the tripod-head by screwing their upper points a into the sockets G, and by reason of the converging inclinations of said sockets the legs must converge from their upper ends downwardly to a point where they cross each other, as shown in Fig. 1, from which point they diverge to their lower ends. This crossing of the legs serves to brace and stiffen them and to render the tripod sufficiently stable for the uses intended, notwithstanding that said legs be made very light and slender. This latter quality enables them by a slight yielding or springing to be spread enough at their lower ends to insure the desired stability of the tripod. The diameter of the legs can be so small and their length so reduced that when freed from the tripod-head and their feet B withdrawn into their lower ends they may be laid up together and secured in exceedingly small compass, making a light and compact bundle, which may be inclosed in a suitable case or not, as desired. In this shape, photographers, especially amateurs, will be induced to carry it, particularly for use with kodaks and similar small cameras, as it will not add materially to their burden and will often be found very useful.

Having thus described my invention, what I claim as new, and desire to secure by Letters Patent, is—

1. A tripod having means for securing a camera and provided with legs of tubular springy metal, said legs crossing each other, but being unconnected and having extension feet or rods fitted telescopically to their lower ends, substantially as herein described.

2. A tripod comprising a head provided with means for securing a camera and tubular legs of springy metal removably fitted to the head and converging downwardly to the point of crossing and thence diverging to their lower ends, said legs being unconnected with each other at their points of crossing and removably fitted to the head, substantially as herein described.

3. A tripod consisting of a head-plate having the inwardly-inclined threaded sockets and tubular metal legs adapted to be removably fitted to said sockets and crossing each other, but unconnected at the points of crossing, whereby the legs are readily removed, substantially as herein described.

4. A tripod consisting of a head-plate having means for securing the instrument and provided with inwardly-inclined threaded sockets, and tubular metal legs fitted to said sockets and crossing each other, but being unconnected at the point of crossing, whereby the legs are readily removed, said legs diverging from the point of crossing and having extension feet or rods fitted telescopically in the lower ends, substantially as herein described.

In witness whereof I have hereunto set my hand.

JAMES HEWITT.

Witnesses:
E. J. STEUART,
GEO. SCHMIDT.